United States Patent
Sakata et al.

(10) Patent No.: US 9,424,557 B2
(45) Date of Patent: Aug. 23, 2016

(54) ELECTRONIC MAIL DATA PROCESSING DEVICE AND METHOD FOR PROCESSING ELECTRONIC MAIL DATA

(75) Inventors: Ryuji Sakata, Kariya (JP); Soichi Saito, Nagoya (JP); Suguru Matsushita, Obu (JP); Shinichi Yamamoto, Toyota (JP); Kazushige Hayashi, Toyota (JP); Masao Sasaki, Okazaki (JP)

(73) Assignees: DENSO CORPORATION, Kariya, Aichi-pref. (JP); AISIN AW CO. LTD., Anjo, Aichi-pref. (JP)

( * ) Notice: Subject to any disclaimer, the term of this patent is extended or adjusted under 35 U.S.C. 154(b) by 602 days.

(21) Appl. No.: 13/316,853

(22) Filed: Dec. 12, 2011

(65) Prior Publication Data

US 2012/0150977 A1    Jun. 14, 2012

(30) Foreign Application Priority Data

Dec. 13, 2010   (JP) .................................. 2010-277007

(51) Int. Cl.
*G06Q 10/10*     (2012.01)
*H04L 12/58*    (2006.01)

(52) U.S. Cl.
CPC ............. *G06Q 10/107* (2013.01); *H04L 51/22* (2013.01)

(58) Field of Classification Search
None
See application file for complete search history.

(56) References Cited

U.S. PATENT DOCUMENTS

| | | |
|---|---|---|
| 6,600,930 B1 | 7/2003 | Sakurai et al. |
| 2008/0021967 A1 | 1/2008 | Kato et al. |
| 2008/0168526 A1* | 7/2008 | Robbin et al. ................ 725/139 |
| 2010/0248693 A1 | 9/2010 | Suzuki |
| 2010/0248694 A1* | 9/2010 | Suzuki ......................... 455/413 |
| 2011/0295925 A1* | 12/2011 | Lieblich et al. .............. 709/202 |

FOREIGN PATENT DOCUMENTS

| | | |
|---|---|---|
| JP | 2001-94610 | 4/2001 |
| JP | 2003-76965 | 3/2003 |

(Continued)

OTHER PUBLICATIONS

U.S. Appl. No. 13/200,158, filed Sep. 20, 2011, Matsushita et al.

(Continued)

*Primary Examiner* — Scott B Christensen
(74) *Attorney, Agent, or Firm* — Harness, Dickey & Pierce, P.L.C.

(57) ABSTRACT

A communication unit connects an e-mail data transfer protocol to transfer e-mail data item via near-field wireless communications with an external device. A retrieval unit retrieves the e-mail data item transferred from the external device when the protocol is connected. A storage unit stores the retrieved e-mail data item. A control unit causes the external device to transfer the e-mail data item in each indication unit of the indication device thereby to cause the storage unit to store the retrieved e-mail data item, when the protocol is connected, and even when a user does not implement a browsing operation of an e-mail list. The control unit further causes an indication device to indicate the e-mail list of the stored e-mail data item when the user implements the browsing operation.

6 Claims, 10 Drawing Sheets

(56) References Cited

FOREIGN PATENT DOCUMENTS

| | | |
|---|---|---|
| JP | 2003-078965 | 3/2003 |
| JP | 2003-98956 | 4/2003 |
| JP | 2004-252563 | 9/2004 |
| JP | 2005-165651 | 6/2005 |
| JP | 2006-33377 | 2/2006 |
| JP | 2008-004131 | 1/2008 |
| JP | 2010-122111 | 6/2010 |
| JP | 2010-231343 | 10/2010 |

OTHER PUBLICATIONS

Kobayashi Q, Sastik, Saslite, ASCII, Japan, Apr. 1, 2005, vol. 29, No. 4, p. 100.

Office Action dated Feb. 4, 2014 in corresponding Japanese Application No. 2010-277007.

* cited by examiner

FIG. 3

| Account 1 | Account 2 | Account 3 |
|---|---|---|
| mail (1-20) | mail (2-15) | mail (3-10) |
| mail (1-19) | mail (2-14) | mail (3-9) |
| mail (1-18) | mail (2-13) | mail (3-8) |
| mail (1-17) | mail (2-12) | mail (3-7) |
| mail (1-16) | mail (2-11) | mail (3-6) |
| mail (1-15) | mail (2-10) | mail (3-5) |
| mail (1-14) | mail (2-9) | mail (3-4) |
| mail (1-13) | mail (2-8) | mail (3-3) |
| mail (1-12) | mail (2-7) | mail (3-2) |
| mail (1-11) | mail (2-6) | mail (3-1) |
| mail (1-10) | mail (2-5) | |
| mail (1-9) | mail (2-4) | |
| mail (1-8) | mail (2-3) | |
| mail (1-7) | mail (2-2) | |
| mail (1-6) | mail (2-1) | |
| mail (1-5) | | |
| mail (1-4) | | |
| mail (1-3) | | |
| mail (1-2) | | |
| mail (1-1) | | |

ELECTRONIC MAIL DATA PROCESSING DEVICE AND METHOD FOR PROCESSING ELECTRONIC MAIL DATA

CROSS REFERENCE TO RELATED APPLICATIONS

This application is based on and claims priority to Japanese Patent Application No. 2010-277007 filed on Dec. 13, 2010, the contents of which are incorporated in their entirely herein by reference.

TECHNICAL FIELD

The present invention relates to an electronic mail data processing device (e-mail data processing device) configured to retrieve electronic mail data (e-mail data) transferred from an external device storing the e-mail data and to process the transferred e-mail data. The present invention further relates to a method for processing electronic mail data.

BACKGROUND

For example, JP-A-2004-252563, JP-A-2006-33377 disclose a configuration including a cellular phone device and a vehicular device. The cellular phone device is configured to implement near-field wireless communications and carried in a vehicle interior. The vehicular device is equipped in the vehicle and also configured to implement near-field wireless communications. When the cellular phone device carried in the vehicle interior is communicable with the vehicular device via the near-field wireless communications, connection of an e-mail data transfer protocol is made between the cellular phone device and the vehicular device for transmission of e-mail data. Thereby, near-field wireless communications is enabled between the cellular phone device and the vehicular device. At this time, a user manipulates the vehicular device to cause the cellular phone device to transfer the e-mail data stored in the cellular phone device to the in-vehicle device thereby to browse the e-mail data stored in the cellular phone device.

It is supposed that a user implements a browsing operation of an e-mail list in the state where the e-mail data transfer protocol is connected between the vehicular device and the cellular phone device. In this case, when the user implements the browsing operation of the e-mail list, the cellular phone device is cased to transfer the e-mail data. Subsequently, after completion of transfer of the e-mail data from the cellular phone device to the vehicular device, the vehicular device indicates the e-mail list of the e-mail data transferred from the cellular phone device. With the present configuration, a user cannot browse the e-mail list after implementing the browsing operation of the e-mail list, until completion of the transmission of the e-mail data from the cellular phone device to the vehicular device.

SUMMARY

In view of the foregoing and other problems, it is an object of the present invention to produce an electronic mail data processing device configured to indicate an electronic mail list promptly, immediately after a user implements a browsing operation of the e-mail list. It is another object of the present invention to produce a method for processing the electronic mail data.

According to an aspect of the present invention, an electronic mail data processing device comprises a communication unit configured to connect an e-mail data transfer protocol to transfer e-mail data item via near-field wireless communications with an external device configured to store the e-mail data item. The electronic mail data processing device further comprises an e-mail data retrieval unit configured to retrieve the e-mail data item transferred from the external device when the e-mail data transfer protocol is connected between the communication unit and the external device. The electronic mail data processing device further comprises an e-mail data storage unit configured to store the e-mail data item transferred from the external device and retrieved by the e-mail data retrieval unit. The electronic mail data processing device further comprises a browsing operation receiving unit configured to receive a browsing operation of an e-mail list implemented by a user. The electronic mail data processing device further comprises a control unit configured to implement: i) an e-mail data transfer processing to cause the external device to transfer the e-mail data item thereby to cause the e-mail data storage unit to store the e-mail data item retrieved by the e-mail data retrieval unit; and ii) an e-mail list indication processing to cause an indication device to indicate the e-mail list of the e-mail data item stored in the e-mail data storage unit when the browsing operation receiving unit receives the browsing operation of the e-mail list implemented by the user. The control unit is further configured to implement the e-mail data transfer processing to cause the external device to transfer the e-mail data item in each indication unit of the indication device thereby to cause the e-mail data storage unit to store the e-mail data item retrieved by the e-mail data retrieval unit, i) when the e-mail data item transfer protocol is connected between the communication unit and the external device, and ii) even when the browsing operation receiving unit does not receive the browsing operation of the e-mail list implemented by the user.

According to another aspect of the present invention, a method for processing electronic mail data, the method comprises connecting an e-mail data transfer protocol to transfer an e-mail data item via near-field wireless communications between a communication unit and an external device configured to store the e-mail data item. The method further comprises causing the external device to transfer the e-mail data item in each indication unit of an indication device thereby to retrieve the transferred e-mail data item and to store the retrieved e-mail data item, i) when the e-mail data item transfer protocol is connected between the communication unit and the external device, and ii) even when a browsing operation of an e-mail list implemented by a user is not received. The method further comprises causing the indication device to indicate the e-mail list of the stored e-mail data item when receiving the browsing operation of the e-mail list implemented by the user.

BRIEF DESCRIPTION OF THE DRAWINGS

The above and other objects, features and advantages of the present invention will become more apparent from the following detailed description made with reference to the accompanying drawings. In the drawings:

FIG. 3 is a schematic view showing stored electronic mail data;

DETAILED DESCRIPTION (Embodiment)

Figure 1:
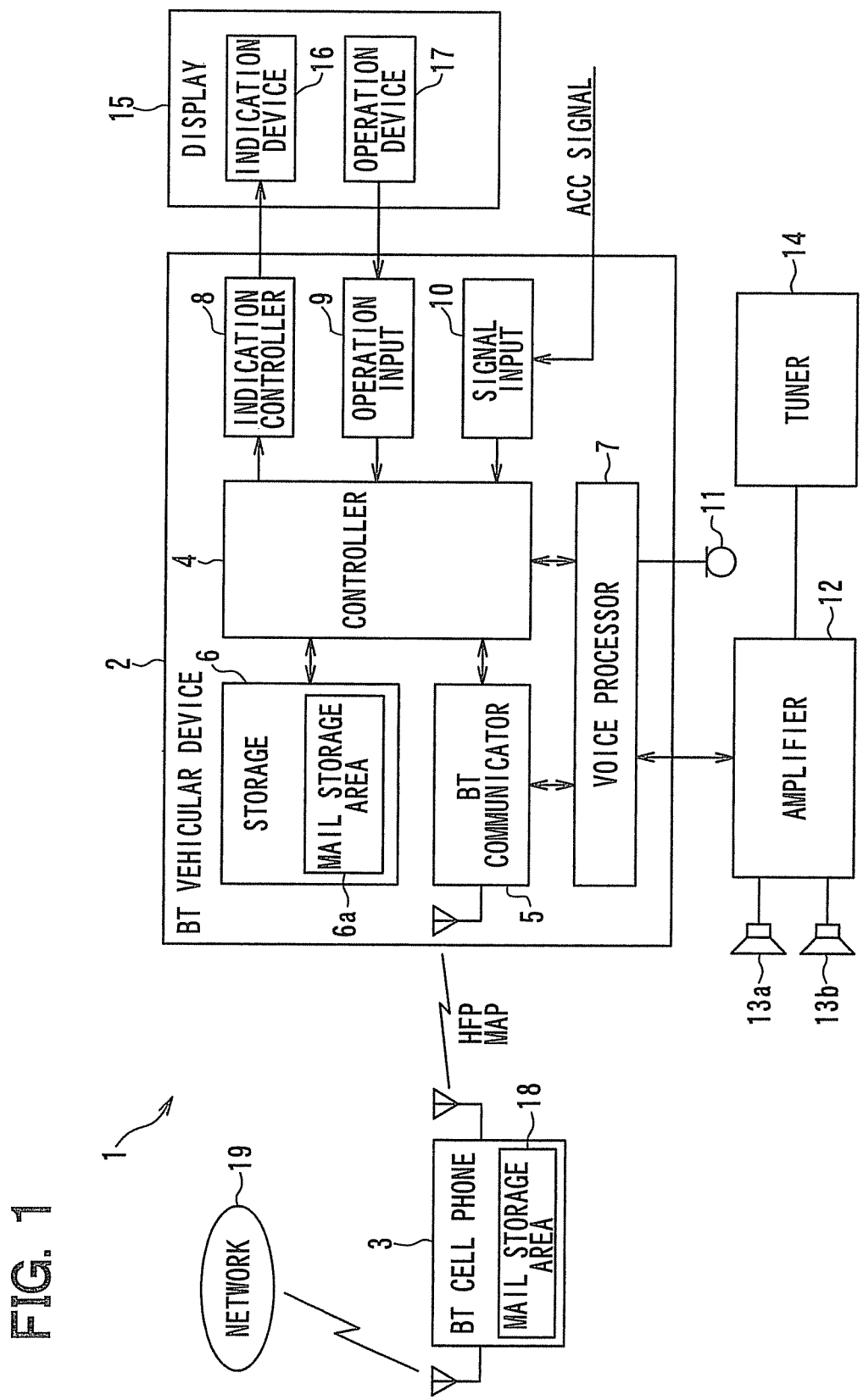
FIG. 1 is a functional block diagram showing a vehicular device according to an embodiment.

As follows, an embodiment will be described with reference to drawings. In the present description, it is supposed that a vehicle has a vehicular device having a Bluetooth (BT: registered trademark) communication function. That is, the vehicular device is a BT-adapted vehicular device. The vehicular device is an example of a vehicular apparatus with a near-field wireless communication function. Further, it is supposed that a BT-adapted cellular-phone device having the BT communication function is carried into an interior of the vehicle. In the present state, the vehicular device and the cellular phone device are communicable via the BT communication function.

A BT communications system 1 includes a vehicular device 2 equipped in the vehicle and a cellular phone device 3 carried into the vehicle interior. The vehicular device 2 may be equivalent to an e-mail data processing device. The cellular phone device 3 may be equivalent to an external device. The vehicular device 2 includes a control unit 4, a BT communication unit 5, a storage unit 6, a voice processing unit 7, a display control unit 8, an operation input unit 9, and a signal input unit 10. The control unit 4 may be equivalent to a control unit. The BT communication unit 5 may be equivalent to a communication unit and an e-mail data retrieval unit. The storage unit 6 may be equivalent to an e-mail data storage unit. The operation input unit 9 may be equivalent to a browsing operation receiving unit and a selection operation receiving unit.

The control unit 4 may be a generally-known microcomputer including a CPU, a RAM, a ROM, an I/O bus, and the like. The control unit 4 controls an operation such as a communication and a data management of the vehicular device 2. The BT communication unit 5 has a function to implement BT communications with the cellular phone device 3. More specifically, the BT communication unit 5 may be configured to implement concurrent connection (multi-connection) by using multiple profiles specified by the BT telecommunications standard, such as the handsfree profile (HFS), which specifies handsfree communications, and the message access profile (MAP), which specifies transmission of e-mail data (e-mail data item). The e-mail (electronic mail) is a general term of information such as a character message and image information exchanged via a generally-known computer network. The HFP and the MAP are communication protocols assigned respectively to functions. The phone book access profile (PBAP), which specifies transmission of telephone directory data, the object push profile (OPP), which specifies transmission of various data, and the like may be used in the connection, in addition to the HFP and MAP.

The storage unit 6 has a storage area for storing various data. Specifically, the storage unit 6 has an e-mail data storage area 6a for storing e-mail data transferred from the cellular phone device 3 and retrieved by the BT communication unit 5. The e-mail data is associated with sender information, receiving time and date information, classification information, and the like. The sender information can be used for identification of a sender (or destination) of an e-mail. The receiving time and date information can be used for identification of the date and time when the cellular phone device 3 receives an e-mail from an e-mail server connected to a communication network 19. The classification information can be used for identification of a classification of an e-mail. For example, the classification information may include a subject name information and the like used for identification of a subject name of an e-mail inputted by a sender.

The e-mail data storage area 6a has a storage capacity sufficient to store e-mail data transferred from the cellular phone device 3 by one connection via the MAP. The e-mail data storage area 6a has a function to sort and store the e-mail data in the reverse chronological order from a new item to an old item according to a receiving date and time. That is, when the e-mail data transferred from the cellular phone device 3 is sorted in the reverse chronological order according to the receiving date and time, the e-mail data storage area 6a stores the e-mail data transferred from the cellular phone device 3 in the reverse chronological order according to the receiving date and time, as it is. Alternatively, when the e-mail data transferred from the cellular phone device 3 is not sorted in the reverse chronological order according to the receiving date and time, the e-mail data storage area 6a sorts the e-mail data transferred from the cellular phone device 3 in the reverse chronological order according to the receiving date and time, and stores the sorted data.

In addition to the e-mail data storage area 6a for storing the e-mail data, the storage unit 6 further has a telephone directory data storage area, an outgoing history data storage area, an incoming historical-data storage area, and the like. The telephone directory data storage area is for storing telephone directory data transferred from the cellular phone device 3 and retrieved by the BT communication unit 5. The outgoing history data storage area is for storing outgoing history data representing correspondence between an outgoing time and an outgoing telephone number related to an outgoing operation from the cellular phone device 3, which connects with the vehicular device 2 via the HFP, or an outgoing operation from the vehicular device 2. The incoming historical-data storage area is for storing incoming historical data representing correspondence between an incoming time related to an incoming operation of the cellular phone device 3, which connects with the vehicular device 2 via the HFP, and an incoming telephone number.

The voice processing unit 7 is connected with a microphone 11 and an audio amplifier 12. The microphone 11 is located in the vehicle interior. More specifically, for example, the microphone 11 is located at a position, for example, close to a handle, such that the microphone 11 can easily collect voice of a user. The audio amplifier 12 is an exterior device of the vehicular device 2 and connected with two speakers 13a and 13b.

In the state where the BT communication unit 5 is connected with the cellular phone device 3 via the HFP and when inputting a voice of a user as transmission audio data from the microphone 11, the voice processing unit 7 implements audio processing to the inputted transmission audio data. Thus, the voice processing unit 7 outputs the audio-processed data to the BT communication unit 5. In the same state, when inputting incoming voice data from the BT communication unit 5, the voice processing unit 7 outputs the inputted incoming voice data to the audio amplifier 12.

When the audio amplifier 12 inputs incoming voice data from the voice processing unit 7, the audio amplifier 12 amplifies the inputted incoming voice data and causes the speakers 13*a* and 13*b* to output the amplified data. The audio amplifier 12 is further connected with a tuner deck 14. For example, the audio amplifier 12 inputs an audio signal of audio contents such as a music content retrieved from a recording medium and a radio program received from a radio station using the tuner deck 14. The audio amplifier 12 amplifies the audio signal and causes the speakers 13*a* and 13*b* to output the audio contents.

A display device 15 includes an indication device 16 and an operation device 17. The indication device 16 indicates various information. The operation device 17 has a touch sensor on a display screen. The display control unit 8 inputs an indication instruction signal from the control unit 4 and controls indication of information on the indication device 16 of the display device 15 based on the inputted indication instruction signal. The operation input unit 9 inputs instruction of a user according to a user's operation of the touch sensor of the operation device 17 via the display screen. The operation input unit 9 outputs an operation detection signal of the inputted instruction to the control unit 4. The control unit 4 analyzes the operation detection signal inputted from the operation input unit 9 and thereby to specify the user's operation.

The signal input unit 10 is connected to an accessory switch device (ACC switch device) equipped in the vehicle. When the signal input unit 10 inputs an ACC signal outputted from the ACC switch device, the signal input unit 10 outputs the inputted ACC signal to the control unit 4. Thereby, the control unit 4 activates and deactivates a device power source according to the activation and deactivation of the ACC signal inputted from the signal input unit 10. That is, the control unit 4 activates device power source to activate the vehicular device 2 at the time point when the ACC signal is switched from OFF to ON. In addition, the control unit 4 deactivates device power source to deactivate the vehicular device 2 at the time point when the ACC signal is switched from ON to OFF. The control unit 4 switches its operation mode from a normal operation mode to a low-power-consumption mode and continues operation, even after stopping the vehicular device 2.

The cellular phone device 3 includes a control unit, a telecommunication unit, a BT communication unit, a key unit, a storage unit, a display unit, a microphone, a speaker, and the like. The control unit controls of an entire operation of the cellular phone device 3. The telecommunication unit performs telephonic communication with the communication network 19. The BT communication unit performs BT communication. The key unit includes various keys arranged on the key unit and operated by a user. The storage unit has an e-mail data storage area 18 for storing the e-mail data related to an e-mail transmitted from the communication network 19 and received by the telecommunication unit. The display unit displays various information on a display screen. The microphone inputs voice of a user. The speaker outputs voice received from a counterpart. In this case, the BT communication unit of the cellular phone device 3 has a function to implement the BT communications with the vehicular device 2 and is configured to implement concurrent connection via multiple profiles, such as the HFP and the MAP, specified by the BT telecommunications standard, similarly to the BT communication unit 5 of the vehicular device 2.

Similarly to the e-mail data storage area 6*a* of the vehicular device 2, the e-mail data storage area 18 has a function to sort the e-mail data in the reverse chronological order according to the receiving date and time and to store the sorted data. That is, the e-mail data storage area 18 sorts e-mail data, which is related to an e-mail transmitted from the communication network 19 and received by the telecommunication unit, in the reverse chronological order according to the receiving date and time. The e-mail data storage area 18 further stores the sorted data. The communication network 19 includes a cellular-phone base station and a facility, which provides a generally-known communication service, such as a base station control, for a cellular phone.

In the above-described configuration, the cellular phone device 3 is configured to set multiple e-mail accounts, and the e-mail data storage area 18 is configured to divide (classify) e-mail data into e-mail data portions for each e-mail account and to store the divided e-mail data portions. The cellular phone device 3 can set the multiple e-mail accounts in this way. Thereby, the control unit 4 of the vehicular device 2 is configured to receive multiple e-mail data items transferred from the cellular phone device 3 correspondingly to the multiple e-mail accounts, via the BT communication unit 5. In addition, the control unit 4 of the vehicular device 2 is configured to divide the received multiple e-mail data items into e-mail data portions for each e-mail account and cause the e-mail data storage area 6*a* to store the e-mail data portions, on receiving the multiple e-mail data items. When the control unit 4 determines that a user implements a browsing operation of an e-mail list, the control unit 4 implements an e-mail list indication processing. Specifically, the control unit 4 causes the indication device 16 to indicate an e-mail list screen 21 showing the e-mail list of e-mail data, which is divided for each e-mail account and stored in the e-mail data storage area 6*a*. The multiple e-mail accounts may include a short message service, a multimedia messaging service, and the like.

Figure 2:
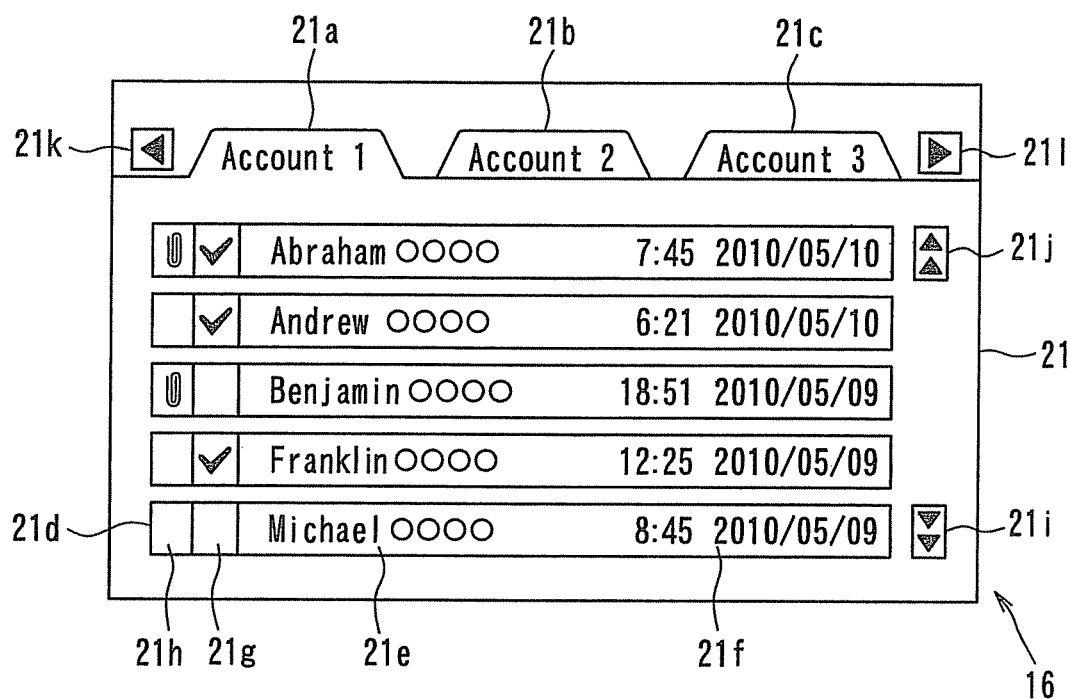
FIG. 2 is a schematic view showing an electronic mail list screen.

FIG. 2 shows one example of the e-mail list screen 21 indicated on the indication device 16 and caused by the control unit 4. In the present embodiment, the cellular phone device 3 is assigned with three e-mail accounts including an Account 1, an Account 2, and an Account 3. The e-mail list screen 21 shown in FIG. 2 indicates tabs 21*a* to 21*c* corresponding respectively to the three e-mail accounts. The e-mail list screen 21 further indicates an e-mail list of the e-mail account selected when the e-mail list screen 21 is indicated. In the example of FIG. 2, the e-mail list screen 21 indicates the e-mail list of the Account 1. The e-mail list includes, for example, five listed information items 21*d* for five subjects. Each of the listed information items 21*d* includes, as one unit, sender information 21*e*, receiving time and date information 21*f*, unread-read information 21*g*, attachment data information 21*h*, and the like. The sender information 21*e* represents a sender (or destination) of an e-mail. The receiving time and date information 21*f* represents the date and time when an e-mail, which is sent from the email server of the communication network 19, is received by the cellular phone device 3. The unread-read information 21*g* represents whether the e-mail is unread or already read. The attachment data information 21*h* represents whether the e-mail has attachment data (accompanying file).

In this case, it is supposed that a user implements a browsing operation of the e-mail list. Immediately after this browsing operation, when an initial configuration sets an e-mail account of the Account 1 to be selected and indicated first, the control unit 4 causes indication of an e-mail list including listed information items 21*d* of five subjects corresponding to the e-mail account of the Account 1. When the control unit 4 determines that the user manipulates the tab 21*b*, the control unit 4 selects the e-mail account of the Account 2 and causes indication of an e-mail list corresponding to the e-mail account of the Account 2. When the control unit 4 determines that the user manipulates the tab 21*c*, the control unit 4 selects the e-mail account of the Account 3 and causes indication of an e-mail list corresponding to the e-mail account of the Account 3.

The e-mail list screen 21 includes indication of an e-mail-list forward scroll key 21*i* and indication of an e-mail-list backward scroll key 21*j*. When the control unit 4 determines that the user manipulates the e-mail-list forward scroll key 21*i*, the control unit 4 causes indication of the listed information items 21*d* including five subjects (with old receiving date and time) prior to the listed information items 21*d* including five subjects currently indicated at that time. Alternatively, when the control unit 4 determines that the user manipulates the e-mail-list backward scroll key 21*j*, the control unit 4 causes indication of the listed information items 21*d* including five subjects (with new receiving date and time) subsequent to the listed information items 21*d* including five subjects currently indicated at that time.

The e-mail list screen 21 further includes indication of an e-mail-account forward scroll key 21*k* and indication of an e-mail-account backward scroll key 21*l*. In a case where an e-mail account (Account 0), which is prior to the three e-mail accounts currently indicated at the time point, is set and when the control unit 4 determines that the user manipulates the e-mail-account forward scroll key 21*k*, the control unit 4 causes indication of a tab corresponding to the e-mail account and causes indication of an e-mail list corresponding to the e-mail account. Alternatively, in a case where an e-mail account (Account 4), which is subsequent to the three e-mail accounts currently indicated at the time point, is set and when the control unit 4 determines that the user manipulates the e-mail-account backward scroll key 21*l*, the control unit 4 causes indication of a tab corresponding to the e-mail account and causes indication of an e-mail list corresponding to the e-mail account.

In the state where the BT communication unit 5 communicates with the cellular phone device 3 via the BT communication channel, the control unit 4 regularly implements the MAP connection. That is, when the communication between the BT communication unit 5 and the cellular phone device 3 is made via the BT communication channel, the control unit 4 automatically implements connection procedure to make the MAP connection. When the MAP connection is made between the BT communication unit 5 and the cellular phone device 3, the control unit 4 causes the BT communication unit 5 to transmit an e-mail-account number request command to the cellular phone device 3. Thereby, the control unit 4 causes the cellular phone device 3 to transfer the number (e-mail-account number) of the e-mail accounts assigned to the cellular phone device 3 at that time. Thus, the control unit 4 retrieves the e-mail-account number transferred from the cellular phone device 3 via the BT communication unit 5.

Further, the control unit 4 implements an e-mail list transmission processing. Specifically, the control unit 4 causes the BT communication unit 5 to transmit an e-mail data request command to the cellular phone device 3. Thereby, the control unit 4 causes the cellular phone device 3 to transfer the e-mail data stored in the cellular phone device 3 at that time. Thereby, the control unit 4 retrieves the e-mail data transferred from the cellular phone device 3 via the BT communication unit 5. Thus, the control unit 4 causes the e-mail data storage area 6*a* to store the retrieved e-mail data. In this case, the control unit 4 causes the cellular phone device 3 to transfer the e-mail data in an indication unit of five subjects, by which the e-mail list screen 21 can indicate at maximum the subjects of the listed information items 21*d* simultaneously at once. That is, the cellular phone device 3 transfers the e-mail data sequentially five subjects by five subjects.

Figure 4:
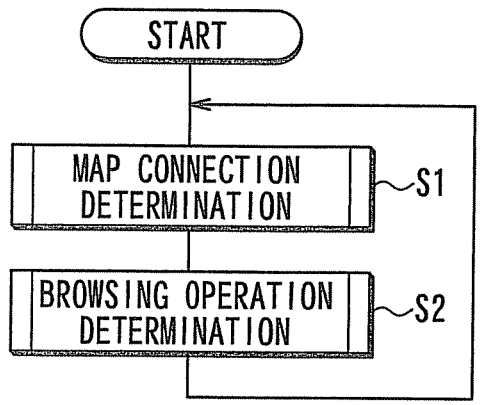
FIG. 4 is a flowchart showing an operation of the vehicular device.
Figure 5:
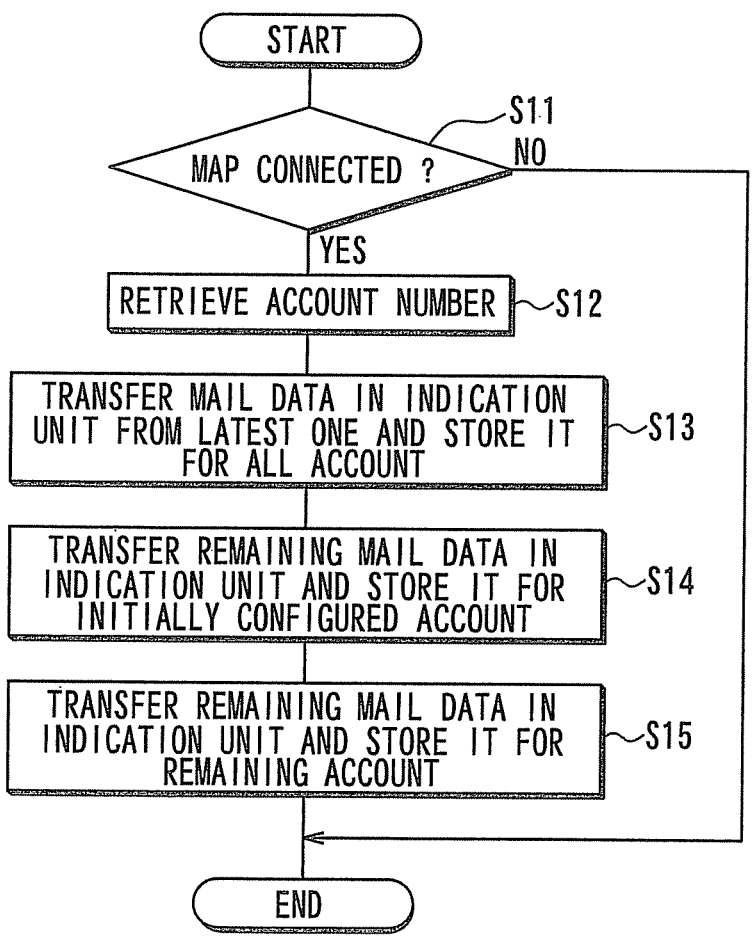
FIG. 5 is a flow chart showing a MAP connection determination processing.
Figure 6:
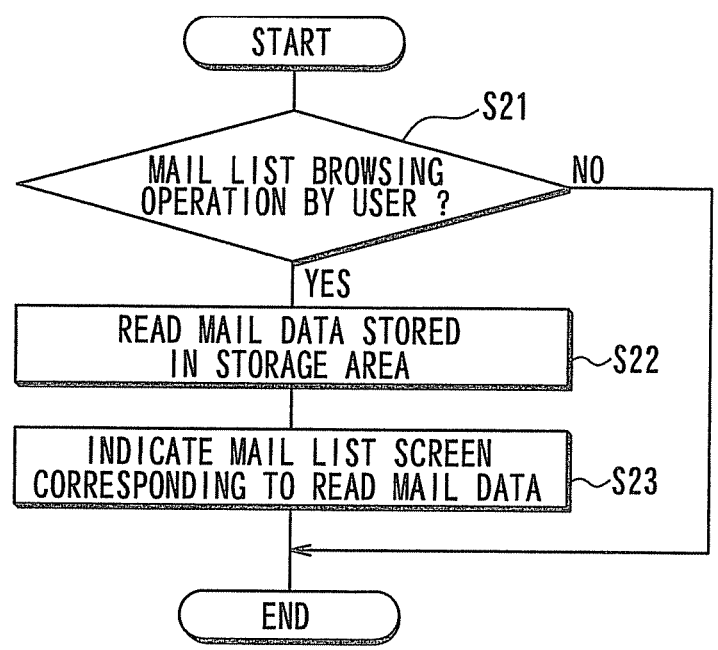
FIG. 6 is a flow chart showing an electronic mail list browsing operation determination processing.

As follows, the operation of the above-described configuration will be described with reference to FIGS. 3 to 11. FIGS. 4 to 6 are flow charts each showing a processing implemented by the vehicular device 2. In the present example, as shown in FIG. 3, it is supposed that the cellular phone device 3 stores e-mail data including 20 subjects of mail (1-1) to mail (1-20) corresponding to the Account 1, e-mail data including 15 subjects of mail (2-1) to mail (2-15) corresponding to the Account 2, and e-mail data including 10 subjects of mail (3-1) to mail (3-10) corresponding to the Account 3. In the notation of mail (m-n), the value m is a natural number, and the value n is also a natural number. In the present example, the value m is one of 1 to 3, and the value n is one of 1 to 20. As the value of n becomes small, the receiving date and time of the e-mail data becomes old. That is, as the value of n becomes large, the receiving date and time of the e-mail data becomes new.

When the device power source of the vehicular device 2 is activated and when the ACC switch device is activated, the control unit 4 implements a main processing. Specifically, the control unit 4 implements sub-processings including a MAP connection determination processing at step S1 and an e-mail list browsing operation determination processing at step S2 in the main processing. The control unit 4 implements periodically the MAP connection determination processing and the e-mail list browsing operation determination processing at a predetermined interval. As follows, the processings will be described. When the device power source of the vehicular device 2 is deactivated, the control unit 4 terminates the main processing.

(1) MAP Connection Determination Processing

At a shift timing from the main processing to the MAP connection determination processing, the control unit 4 starts the MAP connection determination processing. When starting the MAP connection determination processing, at step S11, the control unit 4 determines whether the MAP connection is made between the BT communication unit 5 and the cellular phone device 3. When the control unit 4 determines that the MAP connection between the BT communication unit 5 and the cellular phone device 3 is not made (S11: NO), the control unit 4 terminates the MAP connection determination processing and returns to the main processing.

Alternatively, for example, when a user activates the ACC switch device to activate the vehicular device 2, the communications between the BT communication unit 5 and the cellular phone device 3 is made via the BT communication channel. Thereby, the control unit 4 determines that the MAP connection is made between the BT communication unit 5 and the cellular phone device 3 (S11: YES). In this case, at step S12, the control unit 4 causes the BT communication unit 5 to transmit the e-mail-account number request command to the cellular phone device 3. Thereby, the control unit 4 causes the cellular phone device 3 to transfer the e-mail-account number being set in the cellular phone device 3 at that time. Thus, the control unit 4 retrieves the e-mail-account number being set in the cellular phone device 3 at that time.

Subsequently, at step S13, the control unit 4 causes the BT communication unit 5 to transmit the e-mail data request command to the cellular phone device 3 for all the e-mail accounts being the requested object. Thereby, the control unit 4 causes the cellular phone device 3 to transfer the stored e-mail data in the indication unit (by five subjects) from the newest subject. When the BT communication unit 5 receives the e-mail data transferred from the cellular phone device 3, the control unit 4 causes the e-mail data storage area 6a to store the retrieved e-mail data.

Figure 7:
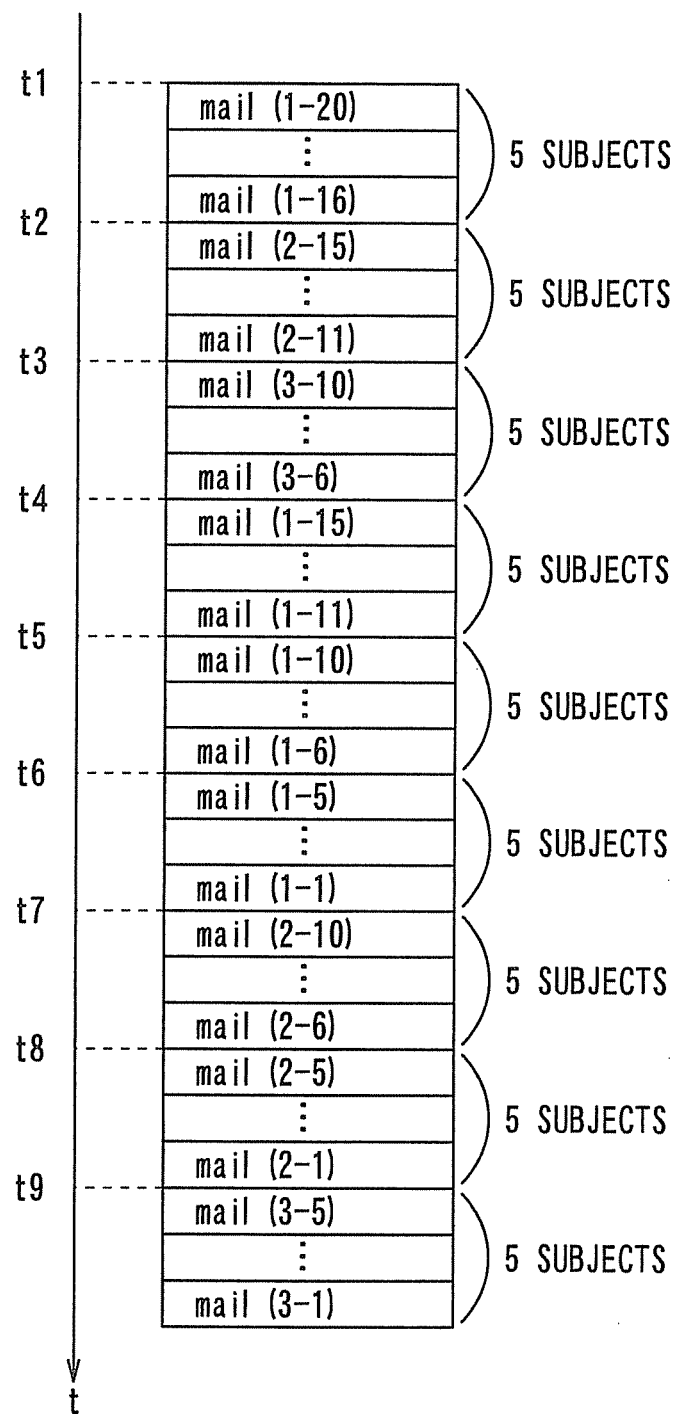
FIG. 7 is a schematic view showing one example of transfer of electronic mail data.

More specifically, as shown in FIG. 7, the control unit 4 causes the cellular phone device 3 to transfer the e-mail data of five subjects of mail (1-16) to mail (1-20) of the Account 1 from the e-mail data stored in the cellular phone device 3. Subsequently, the control unit 4 causes the cellular phone device 3 to transfer the e-mail data of five subjects of mail (2-11) to mail (2-15) of the Account 2 from the e-mail data stored in the cellular phone device 3. Subsequently, the control unit 4 causes the cellular phone device 3 to transfer the e-mail data of five subjects of mail (3-6) to mail (3-10) of the Account 3 from the e-mail data stored in the cellular phone device 3. Thus, the control unit 4 causes the e-mail data storage area 6a to store the transferred e-mail data.

Subsequently, at step S14, the control unit 4 causes the BT communication unit 5 to transmit the e-mail data request command to the cellular phone device 3 for the e-mail accounts, which are selected in the initial configuration, as the requested object. Thereby, the control unit 4 causes the cellular phone device 3 to transfer the remaining (untransferred, non-transferred) e-mail data in the indication unit (by indication unit). When the BT communication unit 5 receives the e-mail data transferred from the cellular phone device 3, the control unit 4 causes the e-mail data storage area 6a to store the retrieved e-mail data.

More specifically, as shown in FIG. 7, the control unit 4 causes the cellular phone device 3 to transfer the e-mail data of five subjects of mail (1-11) to mail (1-15) of the Account 1 from the e-mail data stored in the cellular phone device 3. Subsequently, the control unit 4 causes the cellular phone device 3 to transfer the e-mail data of five subjects of mail (1-6) to mail (1-10) of the Account 1 from the e-mail data stored in the cellular phone device 3. Subsequently, the control unit 4 causes the cellular phone device 3 to transfer the e-mail data of five subjects of mail (1-1) to mail (1-5) of the Account 1 from the e-mail data stored in the cellular phone device 3. Thus, the control unit 4 causes the e-mail data storage area 6a to store the transferred e-mail data.

Subsequently, at step S15, the control unit 4 causes the BT communication unit 5 to transmit the e-mail data request command to the cellular phone device 3 for the remaining e-mail accounts, which are not selected in the initial configuration, as the requested object. Thereby, the control unit 4 causes the cellular phone device 3 to transfer the remaining (untransferred, non-transferred) e-mail data in the indication unit (by indication unit). When the BT communication unit 5 receives the e-mail data transferred from the cellular phone device 3, the control unit 4 causes the e-mail data storage area 6a to store the retrieved e-mail data.

More specifically, as shown in FIG. 7, the control unit 4 causes the cellular phone device 3 to transfer the e-mail data of five subjects of mail (2-6) to mail (2-10) of the Account 2 from the e-mail data stored in the cellular phone device 3. Subsequently, the control unit 4 causes the cellular phone device 3 to transfer the e-mail data of five subjects of mail (2-1) to mail (2-5) of the Account 2 from the e-mail data stored in the cellular phone device 3. Subsequently, the control unit 4 causes the cellular phone device 3 to transfer the e-mail data of five subjects of mail (3-1) to mail (3-5) of the Account 3 from the e-mail data stored in the cellular phone device 3. Thus, the control unit 4 causes the e-mail data storage area 6a to store the transferred e-mail data.

As described above, the control unit 4 causes the cellular phone device 3 to transfer the e-mail data, which is stored in the cellular phone device 3, successively in the indication unit (by the indication unit). When the BT communication unit 5 successively retrieves the e-mail data transferred successively from the cellular phone device 3, the control unit 4 causes the e-mail data storage area 6a to store successively the e-mail data, which is successively retrieved. When the control unit 4 causes the cellular phone device 3 to transfer all the e-mail data stored in the cellular phone device 3 and when the control unit 4 causes the e-mail data storage area 6a to store all the e-mail data transferred from the cellular phone device 3, the control unit 4 terminates the MAP connection determination processing and returns to the main processing.

(2) E-Mail List Browsing Operation Determination Processing

At a shift timing from the main processing to the e-mail list browsing operation determination processing, the control unit 4 starts the e-mail list browsing operation determination processing. At step S21, when starting the e-mail list browsing operation determination processing, the control unit 4 determines whether the e-mail list browsing operation is implemented by a user. When the control unit 4 determines that the e-mail list browsing operation is not implemented by a user (S21: NO), the control unit 4 terminates the e-mail list browsing operation determination processing and returns to the main processing.

Alternatively, for example, when a user manipulates the operation device 17 to implement the e-mail list browsing operation, the control unit 4 determines that the e-mail list browsing operation is implemented by the user (S21: YES). In this case, at step S22, the control unit 4 reads the e-mail data stored in the e-mail data storage area 6a at that time. Subsequently, at step S23, the control unit 4 causes the indication device 16 to indicate the e-mail list screen 21 corresponding to the read e-mail data. Thus, the control unit 4 terminates the e-mail list browsing operation determination processing and returns to the main processing.

In the above description, it is supposed that the e-mail list browsing operation is implemented by a user after all the e-mail data stored in the cellular phone device 3 is transferred from the cellular phone device 3 to the vehicular device 2. It is conceivable that the e-mail list browsing operation may be implemented by a user before all the e-mail data stored in the cellular phone device 3 is transferred from the cellular phone device 3 to the vehicular device 2. That is, the e-mail list browsing operation may be implemented by a user in the course of that the e-mail data stored in the cellular phone device 3 is transferred from the cellular phone device 3 to the vehicular device 2. In this case where the e-mail list browsing operation is implemented before all the e-mail data is transferred, the control unit 4 implements the following processings.

Figure 8:
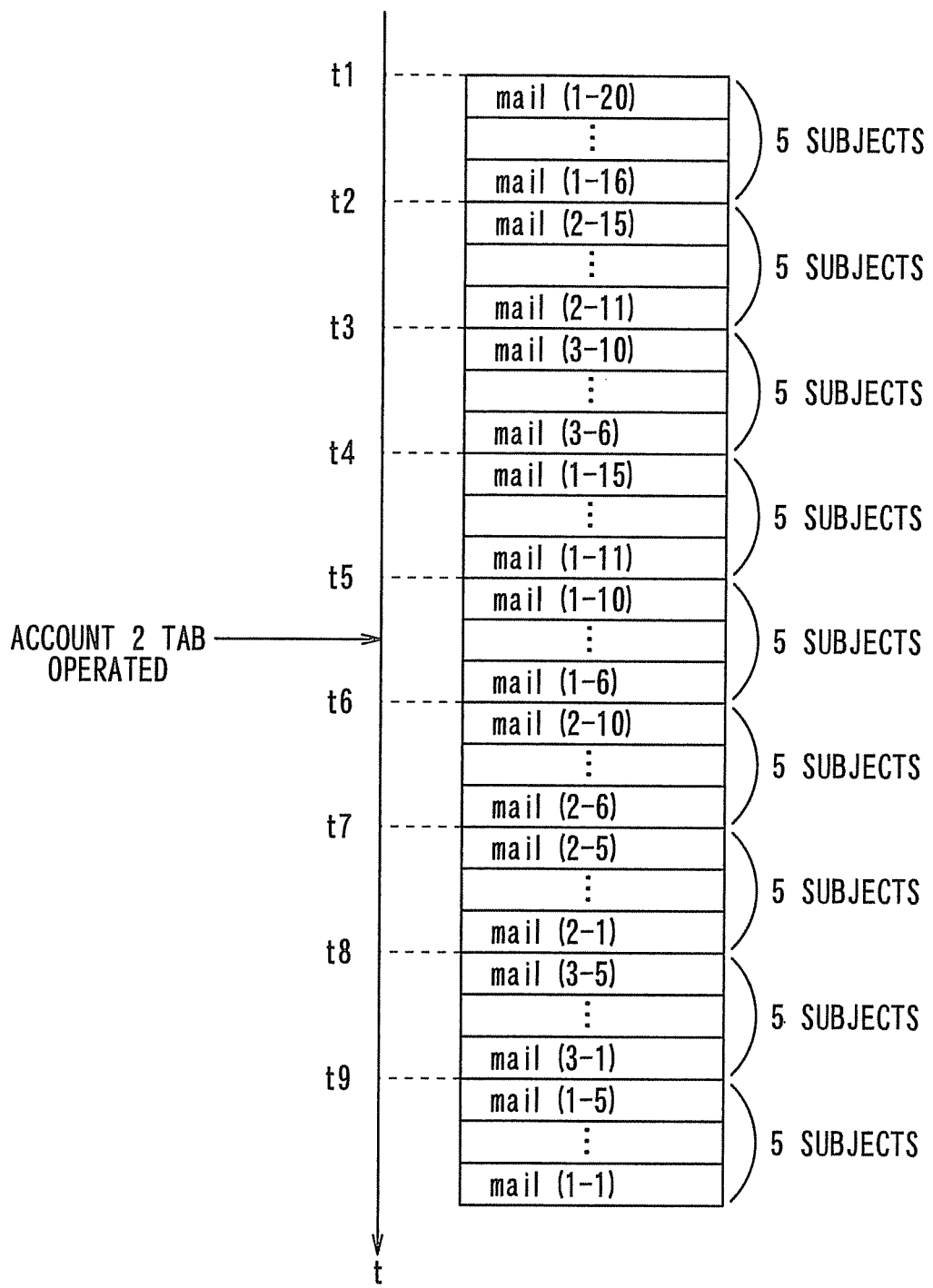
FIG. 8 is a schematic view showing another example of transfer of electronic mail data.

Specifically, as shown in FIG. 8, it is supposed that a user implements the browsing operation of the e-mail list and selects the tab 21b corresponding to the Account 2, in the course of transfer of the e-mail data of five subjects of mail (1-6) to mail (1-10) of the Account 1 among the e-mail data stored in the cellular phone device 3. In this case, the control unit 4 does not implement transfer of the e-mail data of five subjects of mail (1-1) to mail (1-5) of the Account 1, after completion of terminating transfer of the e-mail data of five subjects of mail (1-6) to mail (1-10) of the Account 1. But, the control unit 4 implements transfer of the e-mail data of five subjects of mail (2-6) to mail (2-10) of the Account 2 selected by the user to be transferred. That is, the control unit 4 gives priority to the e-mail data corresponding to the e-mail account selected by the user and causes the cellular phone device 3 to transfer the e-mail data with the priority.

Figure 9:
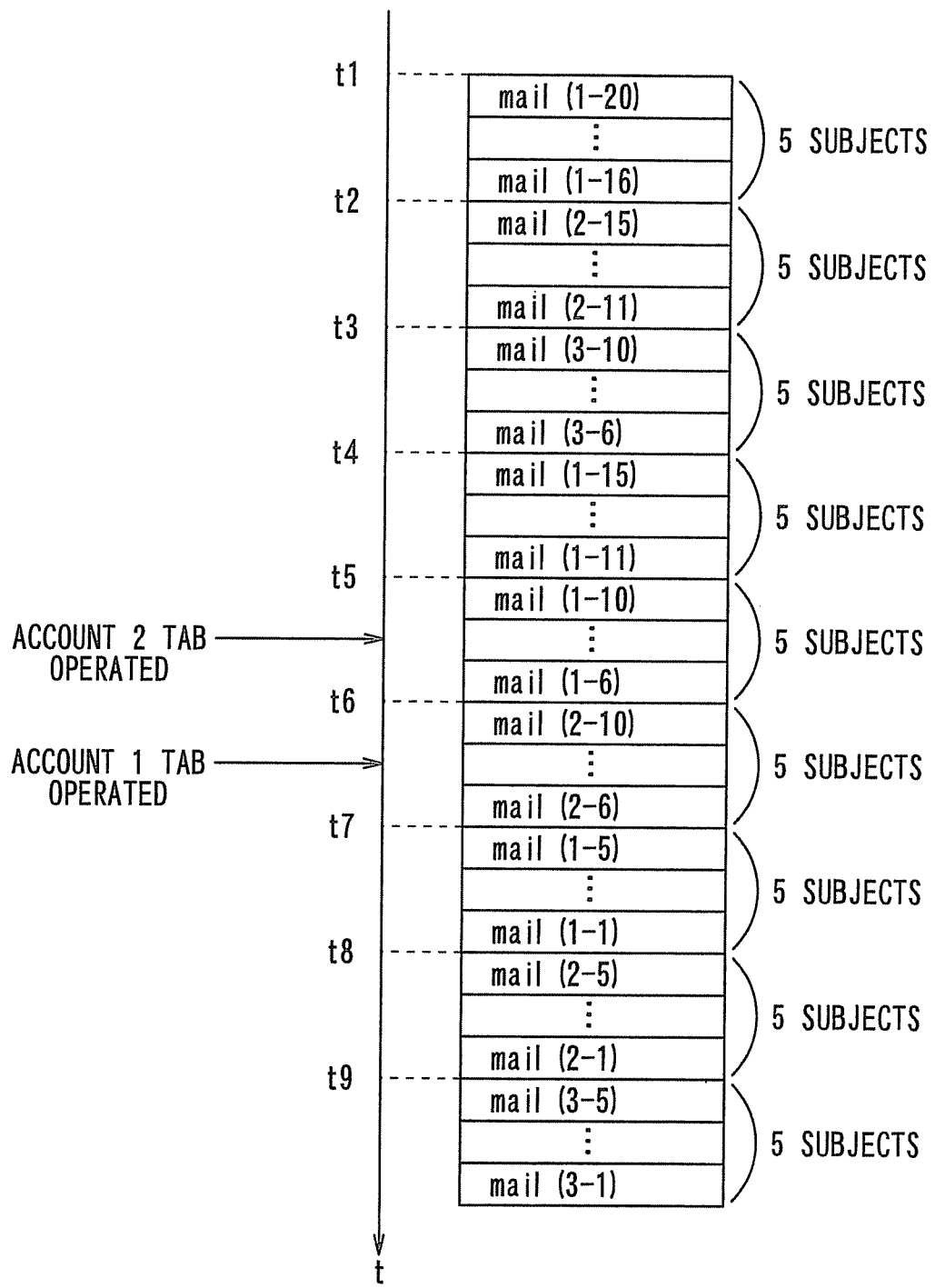
FIG. 9 is a schematic view showing another example of transfer of electronic mail data.

Similarly, as shown in FIG. 9, it is supposed that the user selects the tab 21a corresponding to the Account 1, in the course of transfer of the e-mail data of five subjects of mail (2-6) to mail (2-10) of the Account 2 among the e-mail data stored in the cellular phone device 3. In this case, the control unit 4 does not implement transfer of the e-mail data of five subjects of mail (2-1) to mail (2-5) of the. Account 2, after completion of terminating transfer of the e-mail data of five subjects of mail (2-6) to mail (2-10) of the Account 2. But, the control unit 4 implements transfer of the e-mail data of five subjects of mail (1-1) to mail (1-5) of the Account 1 selected by the user to be transferred.

Figure 10:
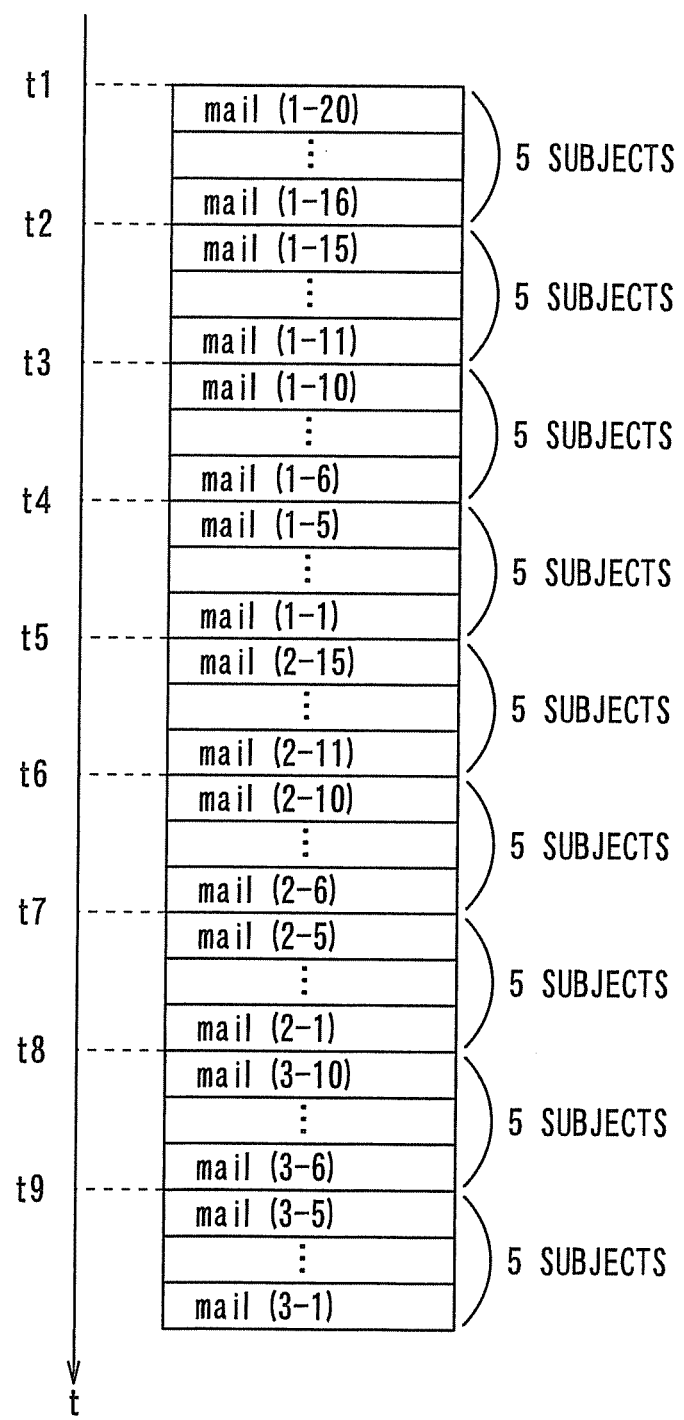
FIG. 10 is a schematic view showing another example of transfer of electronic mail data.

It is not limited to implement the transfer of the e-mail data stored in the cellular phone device 3 in the order described above, and the transfer may be implemented in another order. For example, as shown in FIG. 10, the control unit 4 may implement the transfer of the e-mail data stored in the cellular phone device 3 in such a manner to transfer all the e-mail data of the Account 2 after transfer of all the e-mail data of the Account 1 and to transfer all the e-mail data of the Account 3 after transfer of all the e-mail data of the Account 2.

Figure 11:
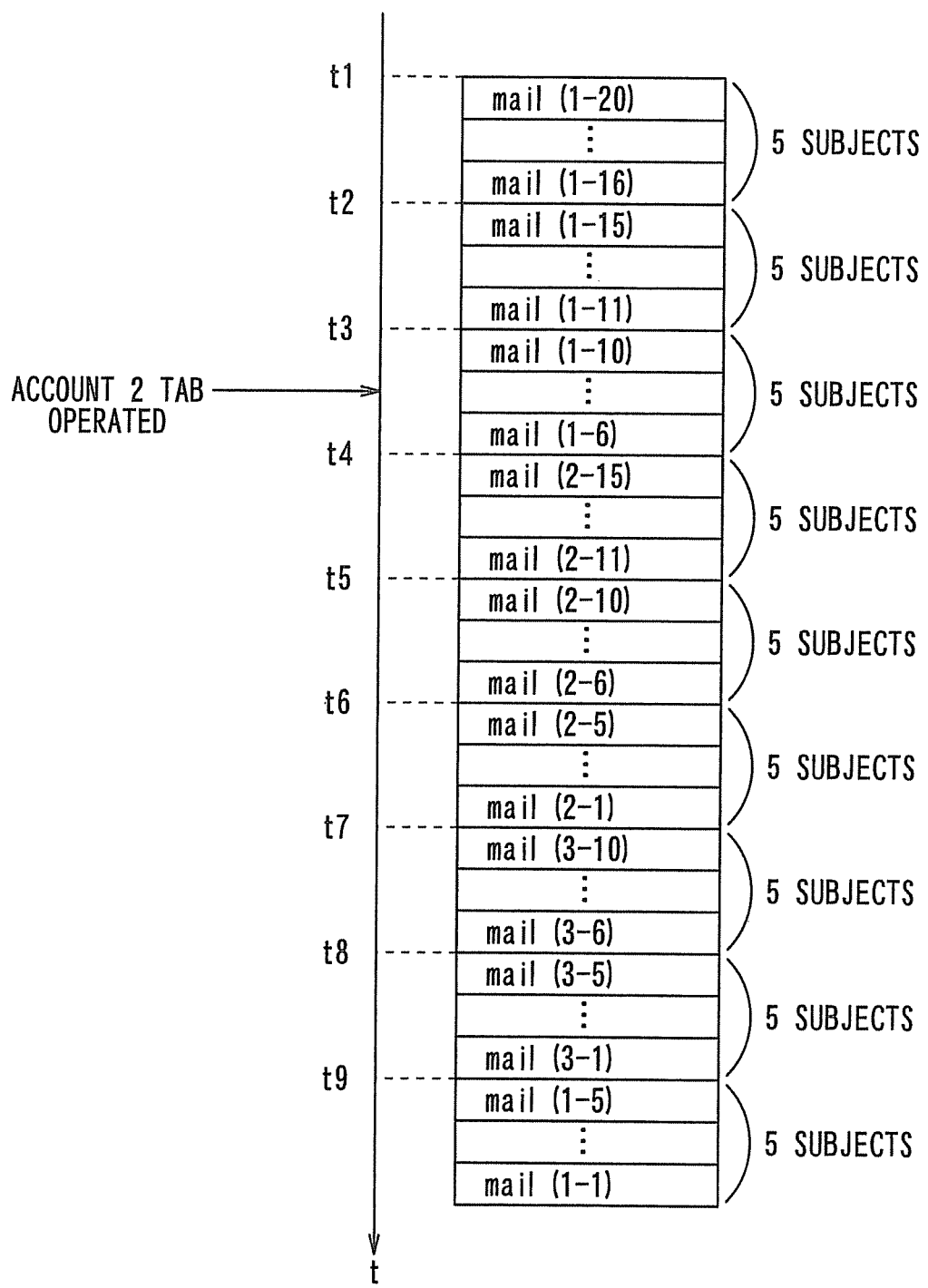
FIG. 11 is a schematic view showing another example of transfer of electronic mail data.

Similarly in this case, as shown in FIG. 11, it is supposed that a user implements the browsing operation of the e-mail list and selects the tab 21b corresponding to the Account 2, in the course of transfer of the e-mail data of five subjects of mail (1-6) to mail (1-10) of the Account 1 among the e-mail data stored in the cellular phone device 3. In this case, the control unit 4 does not implement transfer of the e-mail data of five subjects of mail (1-1) to mail (1-5) of the Account 1, after completion of terminating transfer of the e-mail data of five subjects of mail (1-6) to mail (1-10) of the Account 1. But, the control unit 4 implements transfer of the e-mail data of five subjects of mail (2-6) to mail (2-10) of the Account 2 selected by the user to be transferred. Alternatively, the control unit 4 may implement transfer of the e-mail data of five subjects of mail (2-15) to mail (2-11) of the Account 2, and subsequently, the control unit 4 may implement transfer of the e-mail data of five subjects of mail (2-6) to mail (2-10) of the Account 2. The control unit 4 may give priority to the e-mail data corresponding to the e-mail account selected by the user and may cause the cellular phone device 3 to transfer the e-mail data with the priority.

According to the present embodiment as described above, when the MAP connection is made between the vehicular device 2 and the cellular phone device 3, the e-mail data stored in the cellular phone device 3 is transferred from the cellular phone device 3 for each indication unit, at the time point when the MAP connection is made between the vehicular device 2 and the cellular phone device 3, even when a user does not implement the browsing operation of an e-mail list. Thereafter, when a user implements the browsing operation of an e-mail list, the e-mail list of the stored e-mail data is indicated. With the present configuration, the e-mail list can be indicated promptly, immediately after the user implements the browsing operation of an e-mail list. Thus, user's operability can be enhanced.

Further, in the course of (in the middle of) transfer of the e-mail data stored in the cellular phone device 3 for each indication unit from the cellular phone device 3, when a user implements the browsing operation of an e-mail list and when a user implements the selection operation of an e-mail account, priority is given to the e-mail data corresponding to the e-mail account selected by the user and the e-mail data with the priority is transferred. With the present configuration, the e-mail list of the e-mail data corresponding to the e-mail account selected by the user can be indicated promptly. Thus, user's operability can be further enhanced.

The present invention is not limited to the embodiment, and may be transformed or extended as follows.

The vehicular device may be another device having a function to implement near-field wireless communications with a cellular phone device and a function to retrieve e-mail data transferred from the cellular phone device and to store the retrieved e-mail data. For example, the vehicular device may be a navigation device having a generally-known navigation function.

The cellular phone device may be a portable device, such as a personal digital assistant, having a function to implement near-field wireless communications with the vehicular device and to transfer e-mail data to a vehicular device. It is not limited to use the BT communications between the vehicular device and the cellular phone device. The vehicular device and the cellular phone device may use another type of near-field wireless communications.

In the vehicular device, the number of subjects (indication unit) of the listed information items, which can be simultaneously indicated on the e-mail list screen, is not limited to five subjects. The number of subjects (indication unit) may be six or more and may be four or less. The vehicular device may be configured to, for example, indicate a message, such as "e-mail data is under transmission.", when the e-mail data is transferred from the cellular phone device, thereby to notify a user that it is under transmission of the e-mail data. With the present configuration, the user can be notified of the e-mail data being under transmission. Thus, operability can be further enhanced.

A configuration may be employed to evaluate an operation history of a user to the e-mail list screen thereby to determine e-mail data to be transferred from the cellular phone device. Specifically, when it is determined that a user frequently manipulates the e-mail-list forward scroll key, it is determined that the user has a tendency to browse old e-mail data with early receiving date and time. In this case, priority may be given to the old e-mail data with early receiving date and time, and the cellular phone device may be caused to transfer the old e-mail data with priority in each indication unit. Alternatively, when it is determined that a user frequently manipulates the e-mail-list backward scroll key, it is determined that the user has a tendency to browse new e-mail data with late receiving date and time. In this case, priority may be given to the new e-mail data with late receiving date and time, and the cellular phone device may be caused to transfer the new e-mail data with priority in each indication unit. When it is determined that a user frequently manipulates multiple tabs corresponding to multiple e-mail accounts, it may be determined that the user has a tendency to switch the e-mail account frequently. Thereby, in this case, the multiple e-mail data corresponding to the multiple e-mail accounts may be equalized (uniformed), and the cellular phone device may be caused to transfer the equalized e-mail data in each indication unit. With the present configuration, suitable e-mail data can be transferred from the cellular phone device, in consideration of the user's operation history.

Summarizing the above embodiment, the communication unit is configured to connect the e-mail data transfer protocol to transfer e-mail data item via near-field wireless communications with the external device configured to store the e-mail data item. The e-mail data retrieval unit is configured to retrieve the e-mail data item transferred from the external device in the state where the e-mail data transfer protocol is connected between the communication unit and the external device. The e-mail data storage unit is configured to store the e-mail data item transferred from the external device and retrieved by the e-mail data retrieval unit.

The control unit is configured to implement the e-mail data transfer processing to cause the external device to transfer the e-mail data item thereby to cause the e-mail data storage unit to store the e-mail data item retrieved by the e-mail data retrieval unit. The control unit is further configured to implement the e-mail list indication processing to cause the indication device to indicate the e-mail list of the e-mail data item stored in the e-mail data storage unit when the browsing operation receiving unit receives the browsing operation of the e-mail list implemented by the user.

The control unit is further configured to implement the e-mail data transfer processing to cause the external device to transfer the e-mail data item in each indication unit of the indication device thereby to cause the e-mail data storage unit to store the e-mail data item retrieved by the e-mail data retrieval unit, i) when the e-mail data transfer protocol is connected between the communication unit and the external device, and ii) even when the browsing operation receiving unit does not receive the browsing operation of the e-mail list implemented by the user.

The present configuration is different from a conventional configuration in which the e-mail data item is transferred from the external device at the time point when a user implements the browsing operation of the e-mail list. Dissimilarly to the conventional configuration, in the present configuration, even when a user does not implement the browsing operation of an e-mail list, the e-mail data item is transferred from the external device in each indication unit at the time point when the e-mail data transfer protocol is connected between the communication unit and the external device: Further, the e-mail data item transferred from the external device and retrieved by the e-mail data retrieval unit is stored. Thereafter, when the user implements the browsing operation of the e-mail list, the e-mail list of the stored e-mail data item is indicated. In this way, the e-mail list can be indicated promptly, immediately after the user implements the browsing operation of the e-mail list. Thus, user's operability can be enhanced. That is, user's operability can be enhanced by, in advance, retrieving the e-mail data stored in the external device.

The control unit may be further configured to implement the e-mail data transfer processing to cause the external device to transfer multiple e-mail data items being the object in each indication unit of the indication device thereby to cause the e-mail data storage unit to store the e-mail data items retrieved by the e-mail data retrieval unit, i) when the e-mail data transfer protocol is connected between the communication unit and the external device, and ii) even when the browsing operation receiving unit does not receive the browsing operation of the e-mail list implemented by the user. In this case, the e-mail data items are the object and correspond to the e-mail accounts assigned in the external device.

The present configuration can adapt to the external device assigning (having) multiple e-mail accounts. Thus, even when the user does not implement the browsing operation of the e-mail list, the multiple e-mail data items corresponding to the multiple e-mail accounts are transferred in each indication unit from the external device at the time point when the e-mail data transfer protocol is connected between the communication unit and the external device. Further, the multiple e-mail data items transferred from the external device and retrieved by the e-mail data retrieval unit are stored. Thereafter, when the user implements the browsing operation of the e-mail list, the e-mail list corresponding to one of the stored multiple e-mail data items can be indicated.

The control unit may be further configured to determine the e-mail data transferred from the external device according to the operation history of the user to the e-mail list currently indicated on the indication device. With the present configuration, when, for example, a user has a tendency to read old e-mail data items with old receiving date and time information, priority is given to the old e-mail data items with the old receiving date and time information, and the external device is caused to transfer the old e-mail data items with the priority. Further, when, for example, a user has a tendency to read new e-mail data items with new receiving date and time information, priority is given to the new e-mail data items with the new receiving date and time information, and the external device is caused to transfer the old e-mail data items with the priority. Further, when, for example, a user has a tendency to switch multiple e-mail accounts frequently, multiple e-mail data items corresponding to the multiple e-mail accounts are equalized, and the external device is caused to transfer the equalized e-mail data items. Thus, suitable e-mail data can be transferred from the external device, in consideration of the user's operation history.

The control unit may be further configured to, i) in the course of the e-mail data transfer processing to cause the external device to transfer multiple e-mail data items being the object in each indication unit of the indication device thereby to cause the e-mail data storage unit to store the e-mail data items retrieved by the e-mail data retrieval unit, ii) when the browsing operation receiving unit receives the browsing operation of the e-mail list implemented by the user, and iii) when the selection operation receiving unit receives the selection operation of the e-mail account implemented by the user, give priority to the e-mail data item, which corresponds to the e-mail account selected by the user, and implement the e-mail data transfer processing to the e-mail data item with the priority. In this case, the e-mail data items are the object and correspond to the e-mail accounts assigned in the external device.

In the present configuration, in the course of the e-mail data transfer processing, when the user implements the browsing operation of the e-mail list and when the user implements the selection operation of the e-mail account, priority is given to the e-mail data corresponding to the e-mail account selected by the user and the e-mail data with the priority is transferred. In this way, the e-mail list of the e-mail data corresponding to the e-mail account selected by the user can be indicated promptly. Thus, user's operability can be further enhanced.

The above processings such as calculations and determinations are not limited being executed by the control unit 4. The control unit may have various structures including the control unit 4 shown as an example.

The above processings such as calculations and determinations may be performed by any one or any combinations of software, an electric circuit, a mechanical device, and the like. The software may be stored in a storage medium, and may be transmitted via a transmission device such as a network device. The electric circuit may be an integrated circuit, and may be a discrete circuit such as a hardware logic configured with electric or electronic elements or the like. The elements producing the above processings may be discrete elements and may be partially or entirely integrated.

It should be appreciated that while the processes of the embodiments of the present invention have been described herein as including a specific sequence of steps, further alternative embodiments including various other sequences of these steps and/or additional steps not disclosed herein are intended to be within the steps of the present invention.

Various modifications and alternations may be diversely made to the above embodiments without departing from the spirit of the present invention.

What is claimed is:

1. An electronic mail data processing device comprising:
    a communication unit configured to connect an e-mail data transfer protocol to transfer an e-mail data item via near-field wireless communications with an external device configured to store the e-mail data item;
    an e-mail data retrieval unit configured to retrieve the e-mail data item transferred from the external device when the e-mail data transfer protocol is connected between the communication unit and the external device;
    an e-mail data storage unit configured to store the e-mail data item transferred from the external device and retrieved by the e-mail data retrieval unit;
    a browsing operation receiving unit configured to receive a browsing operation of an e-mail list implemented by a user;
    a control unit configured to implement:
        i) an e-mail data transfer processing to cause the external device to transfer the e-mail data item thereby to cause the e-mail data storage unit to store the e-mail data item retrieved by the e-mail data retrieval unit; and
        ii) an e-mail list indication processing to cause an indication device to indicate the e-mail list of the e-mail data item stored in the e-mail data storage unit when the browsing operation receiving unit receives the browsing operation of the e-mail list implemented by the user, wherein
    the control unit is further configured to implement the e-mail data transfer processing to cause the external device to transfer the e-mail data item in each indication unit of the indication device thereby to cause the e-mail data storage unit to store the email data item retrieved by the e-mail data retrieval unit,
        i) when the e-mail data item transfer protocol is connected between the communication unit and the external device, and
        ii) even when the browsing operation receiving unit does not receive the browsing operation of the e-mail list implemented by the user;
    the external device has a plurality of e-mail accounts, which include a first e-mail account to an n-th e-mail account;
    the control unit is further configured to implement the e-mail data transfer processing which, in response to connecting the e-mail data transfer protocol between the communication unit and the external device automatically causes the external device to transfer a plurality of e-mail data items, at least one of the plurality of e-mail data items corresponding to a respective one of the e-mail accounts in each indication unit of the indication device thereby to cause the e-mail data storage unit to store the e-mail data items retrieved by the e-mail data retrieval unit even when the browsing operation receiving unit does not receive the browsing operation of the e-mail list implemented by the user,
    the electronic mail data processing device, further comprising:
    a selection operation receiving unit configured to receive a selection operation of the e-mail account implemented by a user, wherein
    when the first e-mail account is selected from the e-mail accounts by the user during transfer of e-mail data items corresponding to a second e-mail account in the e-mail data transfer processing, the control unit gives priority to transfer of e-mail data items corresponding to the selected first e-mail account over the transfer of the e-mail data items corresponding to the second e-mail account, and first automatically transfers the e-mail data items corresponding to the first e-mail account after which the not-yet-transferred e-mail data items corresponding to the second e-mail account are automatically transferred,
    such that in the e-mail data transfer processing, a predetermined number of e-mail data items out of a total number of e-mail data items are first automatically transferred per e-mail account in a specified order of the first to the n-th e-mail accounts after which the remaining e-mail data items are automatically transferred per the predetermined number of e-mail data items per e-mail account in the specified order of the first to the n-th e-mail accounts, and
    the predetermined number of e-mail data items is a maximum number of e-mail subjects simultaneously indicatable at once in the e-mail list on an e-mail list screen of the indication device and is common to the plurality of e-mail accounts.

2. The electronic mail data processing device according to claim 1, wherein the control unit is further configured to determine the e-mail data item transferred from the external device according to an operation history of the user to an e-mail list currently indicated on the indication device.

3. The electronic mail data processing device according to claim 1, wherein:
    in the e-mail data transfer processing, the predetermined number of e-mail data items including a last-received e-mail are first automatically transferred per e-mail account in the specified order of the first to the n-th e-mail accounts after which the remaining e-mail data items are automatically transferred per the predetermined number of e-mail data items per e-mail account in the specified order of the first to the n-th e-mail accounts.

4. A method for processing electronic mail data, the method comprising:
    connecting an e-mail data transfer protocol to transfer an e-mail data item via nearfield wireless communications between a communication unit and an external device configured to store the e-mail data item;

causing the external device to automatically transfer the e-mail data item in each indication unit of an indication device thereby to retrieve the transferred e-mail data item and to store the retrieved e-mail data item in an e-mail storage unit;
  i) when the e-mail data item transfer protocol is connected between the communication unit and the external device, and
  ii) even when a browsing operation of an e-mail list implemented by a user is not received;
causing the indication device to indicate the e-mail list of the stored e-mail data item when receiving the browsing operation of the e-mail list implemented by the user;
the external device has a plurality of e-mail accounts which include a first e-mail account to an n-th e-mail account, the method further comprising:
implementing automatic e-mail data transfer processing which, in response to connecting the e-mail data transfer protocol between the communication unit and the external device causes the external device to automatically transfer a plurality of e-mail data items, at least one of the plurality of e-mail data items corresponding to a respective one of the e-mail accounts in each indication unit of the indication device thereby to cause the e-mail data storage unit to store the e-mail data items retrieved by the e-mail data retrieval unit even when the browsing operation receiving unit does not receive the browsing operation of the e-mail list implemented by the user; and
the electronic mail data processing device, further comprising:
receiving a selection operation of the e-mail account implemented by a user,
giving a priority to transfer of an e-mail data item corresponding to the first e-mail account when the first e-mail account is selected by the user during transfer of e-mail data items corresponding to a second e-mail account;
automatically transferring the e-mail data item corresponding to the first e-mail account selected by the user; and
after automatically transferring the e-mail data item corresponding to the first e-mail account selected by the user, automatically transferring the not yet transferred e-mail data items corresponding to the second e-mail account in the e-mail data transfer processing,
such that in the e-mail data transfer processing, a predetermined number of e-mail data items out of a total number of e-mail data items are first automatically transferred per e-mail account in a specified order of the first to the n-th e-mail accounts after which the remaining e-mail data items are automatically transferred per the predetermined number of e-mail data items per e-mail account in the specified order of the first to the n-th e-mail accounts, and
the predetermined number of e-mail data items is a maximum number of e-mail subjects simultaneously indicatable at once in the e-mail list on an e-mail list screen of the indication device and is common to the plurality of e-mail accounts.

5. A non-transitory computer readable medium comprising instructions executed by a computer, the instructions including the method according to claim 4.

6. The electronic mail data processing method according to claim 4, wherein:
in the e-mail data transfer processing, the predetermined number of e-mail data items including a last-received e-mail are first automatically transferred per e-mail account in the specified order of the first to the n-th e-mail accounts after which the remaining e-mail data items are automatically transferred per the predetermined number of e-mail data items per e-mail account in the specified order of the first to the n-th e-mail accounts.

* * * * *